Oct. 1, 1968 L. D. ZEMECK 3,403,604

DIAPHRAGM SEAL

Filed Oct. 27, 1967 2 Sheets-Sheet 1

INVENTOR.
Leonard D. Zemeck
BY
S.C. Thorpe
ATTORNEY

United States Patent Office 3,403,604
Patented Oct. 1, 1968

3,403,604
DIAPHRAGM SEAL
Leonard D. Zemeck, Chicago, Ill., assignor to General Motors Corporation, Detroit, Mich., a corporation of Delaware
Filed Oct. 27, 1967, Ser. No. 678,617
6 Claims. (Cl. 92—99)

ABSTRACT OF THE DISCLOSURE

Relatively reciprocating piston and cylinder-like members are sealed against gaseous and hydraulic fluid leakage therebetween by an elastic flexible diaphragm stretched between the apices of oppositely facing V-grooves in the members, the volumes of the grooves on the hydraulic fluid side of the diaphragm being equal when the members are in their mid-stroke positions. Means are also shown for maintaining the hydraulic fluid pressure against the diaphragm in balance with the gaseous fluid pressure on the opposite side.

Background of the invention

The invention relates to sealing against fluid leakage between slidably reciprocable members such as pistons and cylinders, rods and sleeves, etc., and particularly to improvements in the use of diaphragm type seals therefor to obtain positive sealing against counterleakage flow of hydraulic and gaseous fluids.

Description of prior art

Know prior art on diaphragm type seals extends to those of the so-called rolling type as shown, for example, in U.S. Patent No. 2,702,023 to Seeloff, and to use of flexible diaphragms in piston type fuel pumps and the like as represented for example, by U.S. Patents 1,695,534 to Carter and 3,075,468 to Eifel. In neither of these does the diaphragm seal between sliding surfaces of the relatively reciprocating members, and each requires a much more elaborate diaphragm construction than does my invention.

Summary of the invention

My invention differs therefrom in that the diaphragm extends between the two reciprocable members and is secured in oppositely facing recesses provided in the sliding surfaces of the members, the recesses being designed to accommodate flexing of the diaphragm through the reciprocatory stroke and to provide equal volume spaces on the hydraulic fluid side of the diaphragm so that inter-reception of the hydraulic fluid displaced from the other may occur without increasing the hydraulic fluid pressure on the diaphragm.

Description of the embodiments

Figure 1:
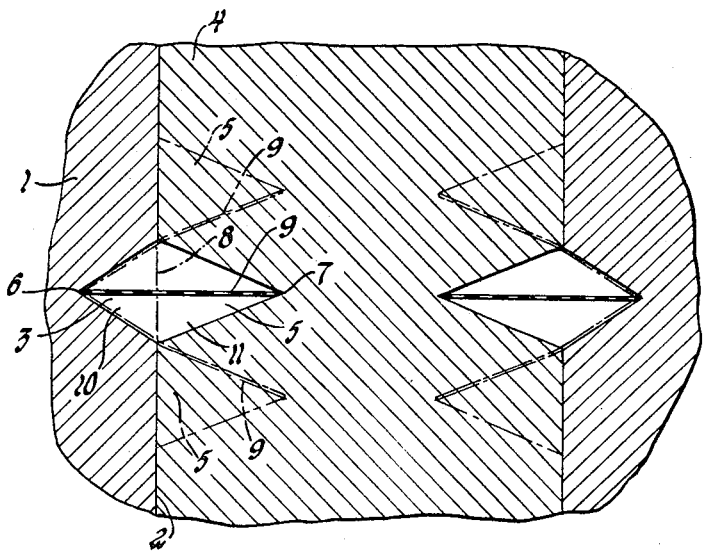
FIGURE 1 is a longitudinal sectional view of two relatively reciprocable members showing one embodiment of my invention wherein the diaphragm seal extends between the apices of the V's of oppositely facing and equal volume V-shape grooves, of isosceles triangle section, provided in the sliding surfaces of the members.

Referring now to the drawings, and first to FIGURE 1, there is shown an outer member 1 having a bore 2 with a recess 3 extending annularly thereof. Slidably reciprocable in the bore 2 is an inner member 4 having an external recess 5 extending annularly thereof and equal in volume to the recess 3. As shown, the inner member is in its midstroke position relative to the outer member 1, wherein the recesses 3 and 5 are located substantially opposite each other. In this embodiment, each of the recesses 3 and 5 is in the form of a V-groove of isosceles triangle shape in radial section having their respective apieces at 6 and 7 and their bases indicated in common by the line 8. A diaphragm 9 of elastic flexible material serves to seal the members 1 and 4 against leakage of gaseous fluid in the downward direction (as viewed in FIGURE 1) and hydraulic fluid in the opposite or upward direction. The diaphragm 9 is annular in shape and interconnects the members within their respective recesses 3 and 5. It extends between the apieces 6 and 7 thereof and is preferably under at least some tension, even when the members are in their midstroke position.

It will be seen that the diaphragm 9 and the recesses 3 and 5 serve cooperatively to define an annular chamber for reception and containment of the hydraulic fluid leaking upwardly between the members. By reason of the equal volumes of the recesses, the portion 10 of this chamber disposed within the recess 3 is equal to the portion 11 of the chamber contained within the recess 5 when the members 1 and 4 are in their midstroke position. During reciprocation of the inner member 4 from its midstroke position, the recess 3 therein and the diaphragm 9 alternately assume the positions indicated in broken outline at the respective ends of the reciprocatory stroke. Thus the diaphragm has freedom to flex within the recesses throughout the reciprocatory stroke, and since the chamber portions 10 and 11 are of equal volume the total quantity of hydraulic leakage fluid contained below the diaphragm is accommodated alternately by enlargement of the respective chamber portions, without any resulting hydraulic pressure rise during the reciprocation of the inner member 4.

Figure 2:
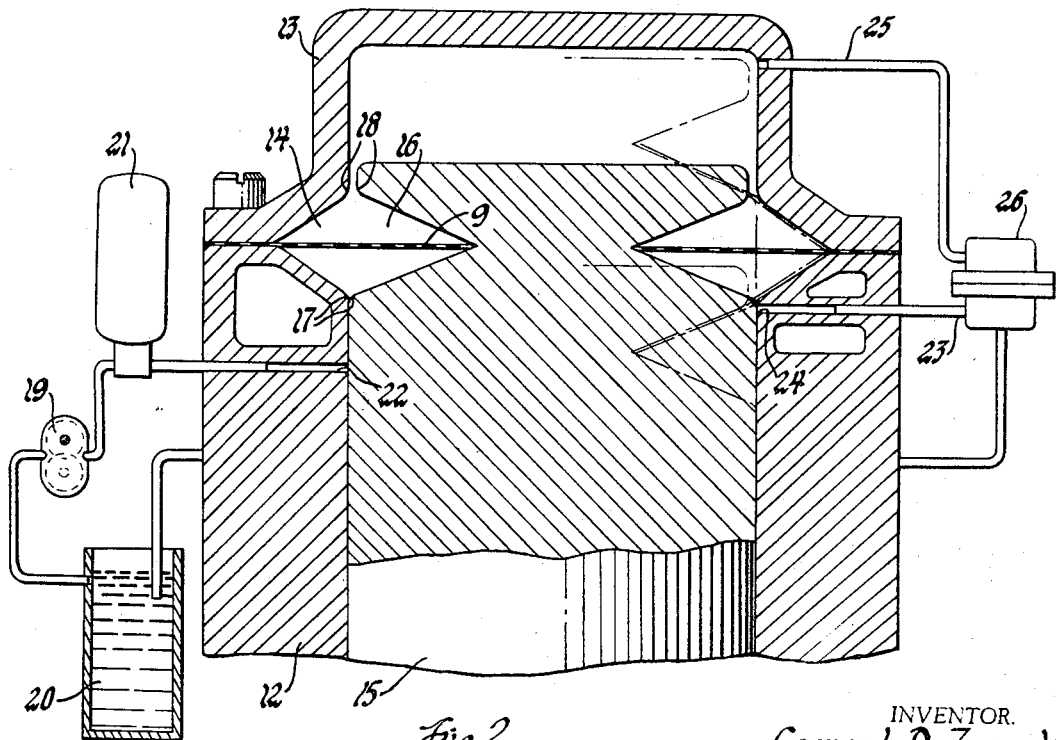
FIGURE 2 is a longitudinal sectional view through a cylinder and piston having the diaphragm extending between V-shaped grooves similar but slightly modified from those of FIGURE 1, and illustrating means for maintaining the hydraulic and gaseous fluid pressures on the diaphragm substantially balanced in an application producing a varying gaseous fluid pressure on the diaphragm.

FIGURE 2 shows an application of the invention in an embodiment wherein the gaseous fluid pressure against the diaphragm varies substantially during operation. The outer member, represented by the cylinder 12 and head 13, has its bore formed with an internal annular V-shaped groove 14 corresponding to the recess 3 previously described and the inner member is in the form of a piston 15 having an exterial V-groove 16 corresponding to the groove 5 of FIGURE 1, except that the outer corner surfaces of the grooves 14 and 16 are rounded off somewhat as shown at 17 and 18 to reduce localized stressing of the diaphragm 9. Also, the diameter of the piston above the recess 16 is reduced somewhat to insure equalization of gaseous fluid pressures above the piston and immediately above the diaphragm. The hydraulic fluid chamber formed within the recesses below the diaphragm is, however, equivalent to that of FIGURE 1 and is divided equally within the cylinder and piston portions thereof when the piston is in its midstroke position. Means are provided for maintaining such hydraulic fluid pressure at a level substantially balancing the gaseous fluid pressure, and included therein is a source of hydraulic pressure in the form of a pump 19 which draws from a reservoir 20 and delivers hydraulic fluid under pressure to an accumulator 21. The accumulator is connected to an inlet port 22 spaced from the recess 14 in the bore of the cylinder member 12. Hydraulic fluid entering the bore via the inlet port 22 serves essentially to replace such hydraulic fluid as may be lost from between the sliding surfaces of the piston and cylinder below the diaphragm, thereby maintaining a substantially constant volume of hydraulic fluid in contact with the diaphragm. Excess hydraulic fluid is enabled to return to the reservoir via a line 23 connected to an outlet port 24 in the cylinder bore, preferably located adjacent the lower side of the recess 14. Interposed in the return line 23 and also connected by a line 25 to the upper end of the cylinder head 13 is a pressure regulator 26 of any suitable design to sense both gaseous fluid pressure above the piston 15 and hydraulic fluid pressure at the outlet port 24. By thereby controlling hydraulic fluid flow out of the cylinder bore in accordance with varying gaseous fluid pressure against the upper side of the diaphragm 9, a balancing hydraulic fluid pressure against the diaphragm is maintained. The broken outlines show the respective positions of the piston and diaphragm at opposite ends of the stroke.

Figure 3:
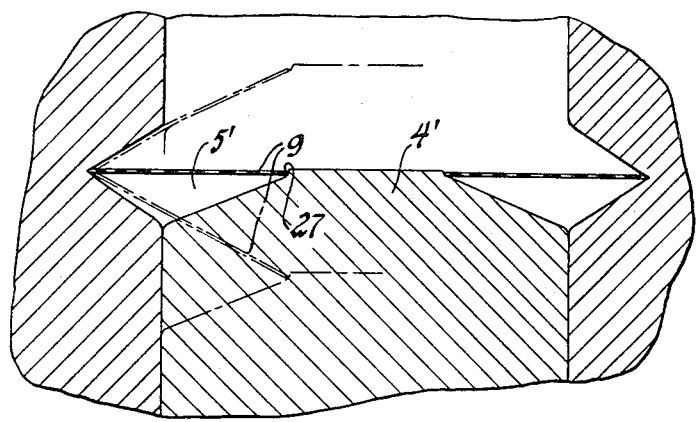
FIGURES 3, 4 and 5 are views similar to FIGURE 1, but showing further modifications of the invention.

Since the requirement for maintaining volume equalization between the recesses applies only to the hydraulic fluid side of the diaphragm, the inner member may be of modified construction as shown in FIGURE 3. In this embodiment the inner member recess 5' is provided by forming the inner member 4' with a frusto-conical upper end, and the diaphragm extends inwardly to the inner diametral extremities 27 thereof.

Figure 4:
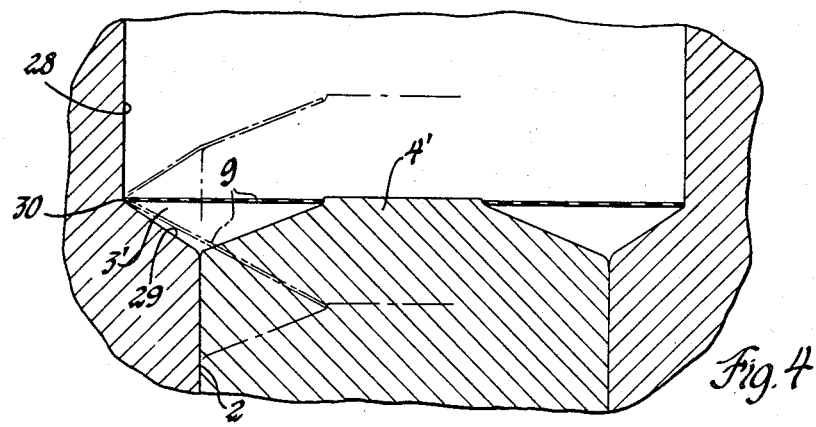

In FIGURE 4 the inner member 4' with frusto-conical upper ends is again used, and the outer member recess 3' is provided in the form of a counterbore 28 connected to the bore 2 by a frusto-conical shoulder 29. In this arrangement, the diaphragm extends outwardly to the outer diametral extremities 30 of the shoulder.

Figure 5:
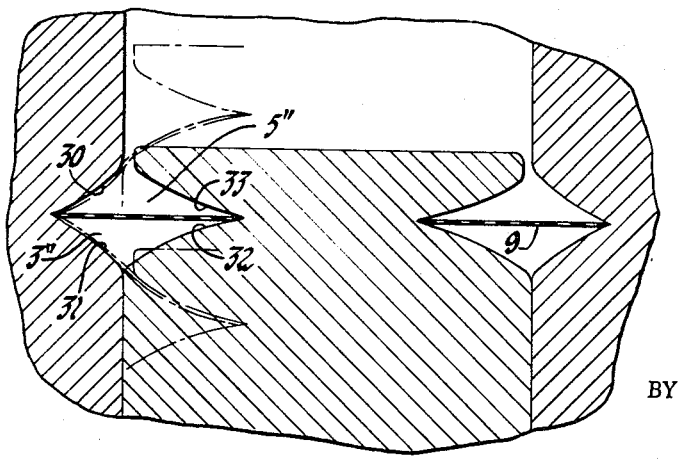

In the FIGURE 5 modification the side walls 30, 31, 32 and 33 of the recesses 3'' and 5'' are curved rather than straight. Obviously other configurations of the recesses may be employed, it being essential only that the respective volumes thereof on the hydraulic fluid pressure side of the diaphragm be substantially equal when the inner member is in midstroke position.

Among the many advantages of the diaphragm seal arrangement of my invention are that it provides for continuous hydraulic support of the diaphragm with minimal elongation against gaseous fluid pressures. No rolling or substantial bending stresses are induced in the diaphragm, and its inherently high surface exposure serves to afford maximum dissipation of the heat to the fluids in contact with it.

It is appreciated that various changes in the design of the parts and their arrangement from that described may be made without departing from the scope of the invention as hereinafter claimed.

I claim:

1. The combination of an outer member having a bore with a recess extending annularly thereof, an inner member slidably reciprocable in said bore and having an external recess extending annularly thereof, said recesses being substantially opposite each other in the mid-stroke position of said inner member, and a diaphragm of elastic flexible material for sealing against leakage of hydraulic fluid between said members, said diaphragm being connected to said members within their respective recesses and extending therebetween in tension when the inner member is in its mid-stroke position, each of said recesses accommodating axial flexure of the diaphragm therein throughout the reciprocatory stroke of the inner member, said recesses and diaphragm defining an annular chamber on one side of the diaphragm for containment of said leakage fluid, the volumes of the respective portions of said chamber disposed within said inner and outer member recesses being substantially equal when the inner member is in its mid-stroke position, whereby fluid displaced from one of said chamber portions by said diaphragm during movement of the inner member through its reciprocatory stroke is accommodated by enlargement of the other of said chamber portions at substantially constant fluid pressure.

2. The invention of claim 1, wherein said inner member recess is in the form of a frusto-conical end of the inner member.

3. The invention of claim 2, wherein said outer member recess is in the form of a generally V-shaped groove, and said diaphragm extends from the apex of the V of said groove to the minor diametral extremities of said frusto-conical end of the inner member.

4. The invention of claim 2, wherein said outer member recess is in the form of a counterbore connected to said bore by a frusto-conical shoulder, and said diaphragm is connected between the major diametral extremities of said frusto-conical shoulder and the minor diametral extremities of said frusto-conical end of the inner member.

5. The invention of claim 1, wherein each of said recesses is in the form of a V-shaped groove, and said diaphragm extends from the apex of the V of one of said grooves to the apex of the other of said grooves.

6. The invention of claim 5, wherein the opposite side of said diaphragm is exposed to a gaseous fluid pressure, and including means for maintaining said hydraulic fluid pressure at a level substantially balancing said gaseous fluid pressure, said means comprising a source of hydraulic pressure, an inlet port in said bore connected to said source, an outlet port in said bore, said ports being located on the same side of the diaphragm as said chamber, said outlet port being adjacent the groove in the outer member and said inlet port being spaced from said outer member groove, and a pressure regulator responsive to both said gaseous fluid pressure and to hydraulic fluid pressure in said outlet port for controlling fluid flow out said outlet port.

References Cited

UNITED STATES PATENTS

| | | | |
|---|---|---|---|
| 2,717,792 | 9/1935 | Pelley | 74—18 |
| 2,896,987 | 7/1959 | Meyer | 74—18.2 |
| 2,931,311 | 4/1960 | Ulm et al. | 92—100 |
| 3,195,360 | 7/1965 | Burnett | 74—18.2 |
| 3,118,389 | 1/1964 | Camp | 74—18.2 |
| 3,241,379 | 3/1966 | Rietdijk et al. | 92—98 |
| 3,272,089 | 9/1966 | Rietdijk | 92—99 |
| 3,277,795 | 10/1966 | Rietdijk | 92—99 |
| 3,339,464 | 10/1967 | Rietdijk | 92—98 |
| 3,318,200 | 5/1967 | Rietdijk | 92—98 |

FOREIGN PATENTS 524,832  12/1953  Belgium.

MARTIN P. SCHWADRON, *Primary Examiner.*

B. L. ADAMS, *Assistant Examiner.*